March 3, 1964  G. B. STONE  3,122,986
POTATO RICER
Filed Feb. 10, 1960 3 Sheets-Sheet 1
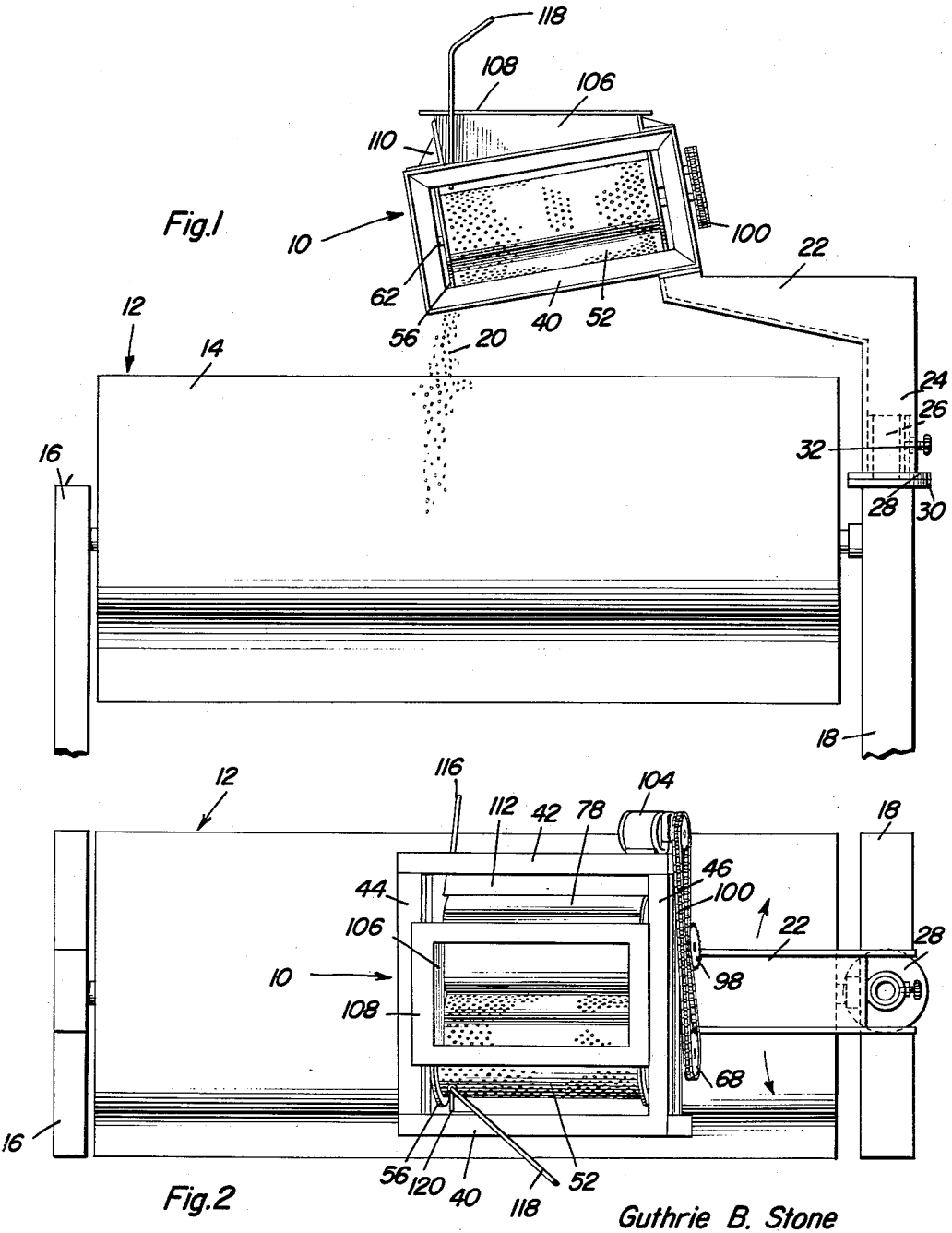
Guthrie B. Stone
INVENTOR.

March 3, 1964   G. B. STONE   3,122,986
POTATO RICER
Filed Feb. 10, 1960   3 Sheets-Sheet 2

Guthrie B. Stone
INVENTOR.

BY Clarence A. O'Brien
and Harvey B. Jacobson
Attorneys

March 3, 1964        G. B. STONE        3,122,986
POTATO RICER
Filed Feb. 10, 1960        3 Sheets-Sheet 3
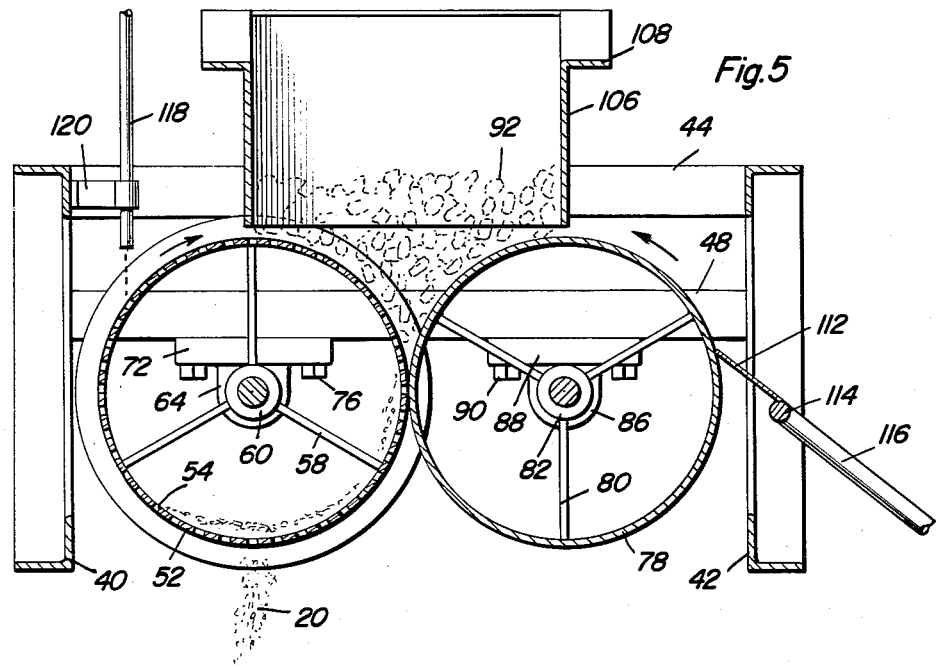
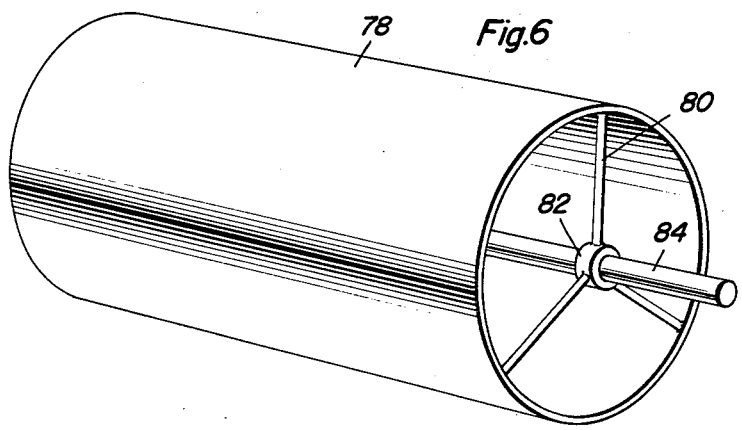
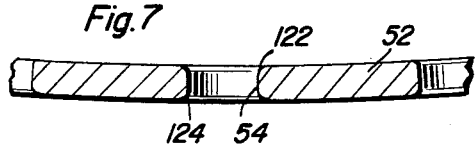
Guthrie B. Stone
INVENTOR.

United States Patent Office 3,122,986
Patented Mar. 3, 1964

3,122,986
POTATO RICER
Guthrie B. Stone, % Stone Conveyor Co., Inc., Honeoye, N.Y.
Filed Feb. 10, 1960, Ser. No. 7,899
1 Claim. (Cl. 99—246)

The present invention generally relates to a device for ricing vegetables, and the like and more particularly to a ricer for cooked potatoes.

Recently, there has been developed a potato flake process in which a riced potato mash is applied to a drum dryer where it is dried to a flake form. In this process, the potatoes are sliced to a desired thickness and then cooked after which they are riced by suitable mechanism and then conveyed to a dryer. However, the present ricers have a tendency to smear or rub together the riced potatoes and the excessive handling together with contact with the machine causes rupture of the cellular structure of the potatoes. In a ricer that has been developed by the Department of Agriculture, there is a relatively enlarged perforated metal drum with two small solid rolls which push the mash through the drum with the material disposed within the mash drum then removed by an internal screw auger which will pull the riced potato out of the drum which is mounted horizontally. If the potatoes are not cooked exactly right, the small rollers will not force the potatoes through the perforated drum as they tend to slip away from the small rollers whereby the ricing of the potatoes is ineffective and results in a lower quality product.

The primary object of the present invention is to provide a potato ricer mounted directly over a drum dryer for discharging riced potatoes thereon directly for drying with the ricer having an entrance hopper for receiving the potatoes from the area in which the potatoes have been cooked preferably by steam cooking.

Another object of the present invention is to provide a potato ricer incorporating in its construction a perforated drum and a solid drum of substantially the same diameter disposed in very small clearance relation to each other whereby cooked potatoes fed between the drums will be forced into the interior of the perforated drum.

A further important feature of the present invention is to provide a potato ricer in accordance with the preceding objects in which the perforated drum and also the solid drum are disposed in an inclined plane with the lower end of the perforated drum being open for discharging the riced potatoes from the perforated drum directly onto a drum dryer disposed therebelow.

A further important structural feature of the present invention is to provide a swivel mount for the potato ricer so that it may be moved away from the drum dryer for cleaning purposes.

Other features of the present invention resides in its extreme simplicity of construction, effectiveness for its particular purposes and its relatively initial low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevation of the ricer of the present invention illustrating its orientation in relation to a drum dryer;

FIGURE 2 is a plan view of the construction of FIGURE 1;

FIGURE 5 is a detailed, transverse sectional view taken substantially along section line 5—5 of FIGURE 4;

FIGURE 6 is a perspective view of the solid drum; and

FIGURE 7 is a detailed enlarged sectional view of the perforated drum illustrating the construction of the perforations therein.

Figure 3:
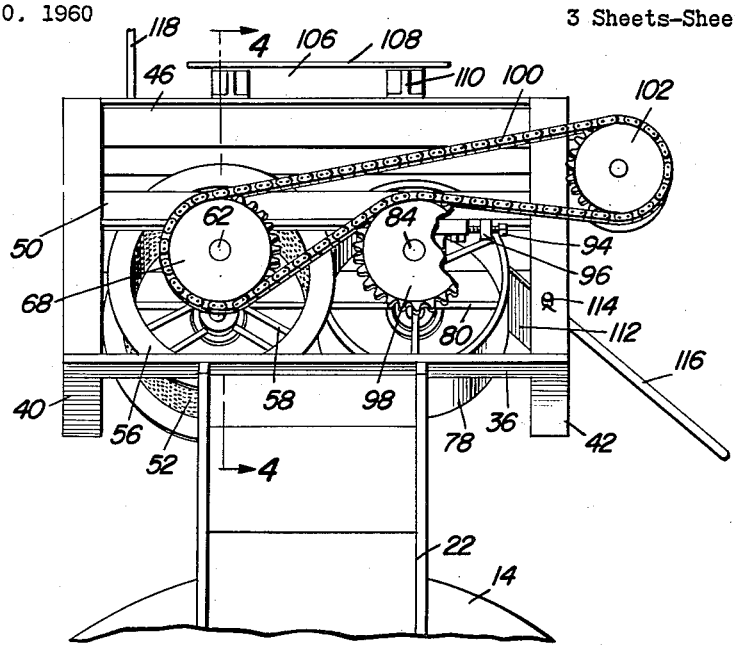
FIGURE 3 is an end elevational view of the potato ricer taken from the drive end with portions of one of the gears broken away illustrating the mechanism for adjusting the ricer drums in relation to each other.

Referring now specifically to the drawings, the numeral 10 generally designates the potato ricer of the present invention which is illustrated as being orientated directly above a drum dryer generally designated by the numeral 12. The drum dryer 12 is not specifically disclosed except that it is generally in the form of a cylindrical drum 14 rotatably supported by supporting stands 16 and 18 at the ends thereof and the drum dryer 12 receives riced potatoes from the ricer 10 and dries them into flake form. Since conveying riced potatoes causes damage to the cellular structure thereof, it is an important feature of the present invention to locate the ricer 10 for directly discharging the riced potatoes 20 onto the drum 14 of the drum dryer 12.

Also, the potato ricer 10 is mounted on and supported by a substantially L-shaped arm 22 having a depending leg portion 24 journaled on an upstanding stud 26 on the stand 18 wherein the ricer 10 may be swung about a vertical axis formed by the stud 26 to an out-of-the-way position in relation to the drum dryer 12 for ease of cleaning the potato ricer 10. The lower end of the leg portion 24 may be provided with a flange 28 engaging a stationary flange 30 on the upper end of the stand 18 and a suitable setscrew 32 may be provided for locking the supporting arm 22 in position thereby enabling the potato ricer 10 to be disposed in overlying relation to the drum dryer when in operative position or when arranged in an out-of-the-way position for ease of cleaning.

Figure 4:
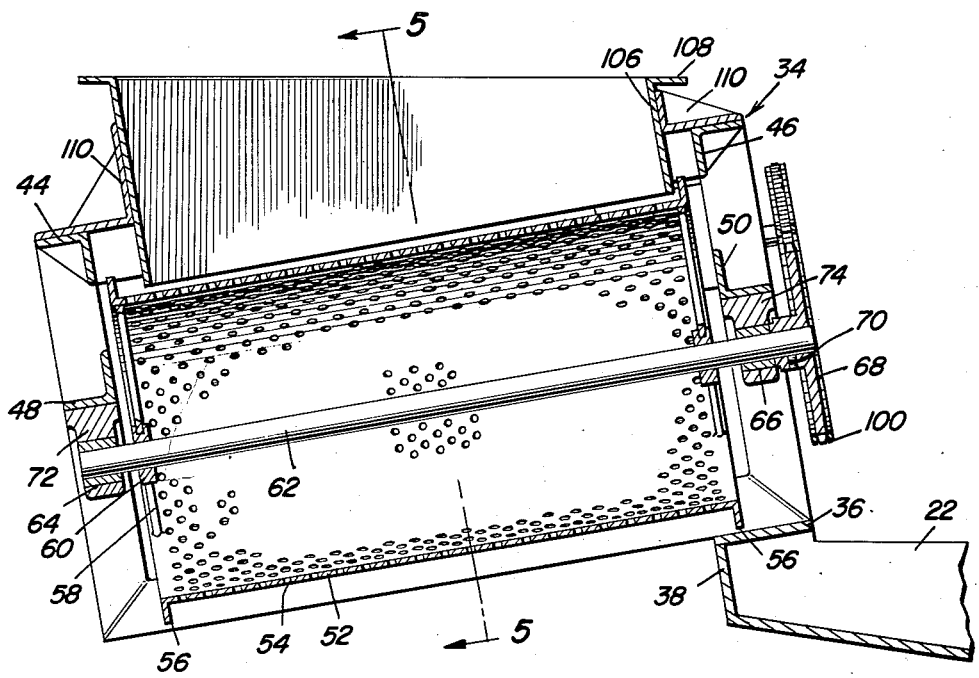
FIGURE 4 is a longitudinal, vertical sectional view taken substantially upon a plane passing along section line 4—4 of FIGURE 3 illustrating the details of construction of the perforated drum and the hopper.

The potato ricer 10 includes an inclined frame generally designated by numeral 34 which includes a transverse support bar 36 rigidly affixed to an upturned end 38 of the support arm 22. Rigid with the transverse support bar 36 is a pair of open rectangular side frames 40 and 42, each of which includes parallel top and bottom rails and parallel end rails all of which may be conveniently of angle iron construction. The side frames 40 and 42 are rigidly interconnected at the top corners thereof by end rails or frame members 44 and 46 respectively. Intermediate the end rails, the side frames 40 and 42 are interconnected by intermediate frame members or end rails 48 and 50 respectively which also may be conveniently of angle iron construction. Thus, the frame 34 is open downwardly and to either side and the side frames 40 and 42 are retained in rigid relation. As clearly illustrated in FIGURE 4, the frame 34 is disposed in inclined relation, that is, the end of the frame 34 attached to the support arm 22 is disposed above the other end of the frame 34.

Adjacent the side frame 40, a cylindrical drum 52 is provided with the drum 52 having a plurality of apertures or perforations 54 therein thereby forming a perforated drum. The end edges of the perforated drum 52 are each provided with an outwardly extending peripheral flange 56 and extending inwardly from each end of the perforated drum 52 is a plurality of radial spokes 58 terminating in and rigidly secured to a central hub 60 at each end of the perforated drum 52. A longitudinally extending shaft 62 extends through and is detachably connected with the hubs 60 with the terminal ends of the shaft 62 being journaled in bearings 64 and 66 respectively that are supported on the intermediate end rails 48 and 50 respectively. The end of the shaft 62 supported by bearing 66 projects outwardly beyond the bearing 66 and is provided with a drive sprocket gear 68 rigidly affixed thereto. The sprocket gear 68 is secured in position by a suitable setscrew 70 and the bearings 64 and 66 are supported by suitable bearing blocks 72 and 74 secured in position by suitable bolts 76. Thus, with this construction, the sprocket gear 68 will cause the perforated drum 52 to be rotated about its longitudinal axis and the drum is open at both ends and the longitudinal axis thereof is inclined so that material disposed interiorly of the drum will be discharged from the lower end of the drum 52 directly onto the drum dryer 12.

Supported alongside of and parallel to the perforated drum 52 is an imperforate drum 78 having radially extending spokes 80 adjacent each end thereof terminating in a hub 82 secured to the longitudinally extending shaft 84. The shaft 84 is supported on bearings 86 carried by bearing blocks 88 secured in position by bolts 90. Also, the length of the drum 78 is slightly less than the drum 52 and is disposed between the flanges 56 of the perforated drum 52 whereby the flanges 56 acts somewhat as a retainer for the cooked and sliced potatoes 92 as they proceed into the bight crotch formed by the rotating drum 52 and 78 as illustrated in FIGURE 5 whereby the cooked potatoes are forced through the perforations 54 by the solid drum 78 and are subsequently discharged from the discharge end of the drum 52 as riced potatoes 20.

Inasmuch as the drums are disposed in close proximity to each other, an adjustment screw 94 may be provided for moving the bearing blocks 88, 72 and 74 by virtue of the adjusting screw 94 being threaded through a lug 96 rigid with the frame rails 48 and 50 with the supporting bolts 76 and 90 extending through suitably provided slots in the frame rails 48 and 50. Also, the shaft 84 is provided with a sprocket gear 98 thereon which engages the sprocket chain 100 and adjustment of the drums also will effect tensioning of the chain 100 which also encircles the drive gear 102 that is powered by a suitable electric motor 104 supported on the frame 34 and more particularly on the side frame 42. Since the lower run of the chain 100 passes over the sprocket gear 98 and then encircles the sprocket gear 68, the drums 52 and 78 will be rotated in opposite directions as illustrated by the arrows in FIGURE 5.

For feeding the potatoes into the crotch between the drums 78 and 52, there is provided a generally rectangular hopper 106 having a lower edge disposed closely adjacent the drums with the upper edge of the hopper 106 having a horizontal flange 108 for attachment to a suitable conveyor. The hopper is supported from the upper end rails 44 and 46 by suitable L-shaped brackets 110. The hopper 106 may receive the potatoes directly from a steam cooker (not shown).

Also provided for the solid drum 78 is a scraper knife or blade 112 supported by a support rod 114 and having a handle 116 for discharging foreign material picked up by the solid drum 78 from the cooked potatoes. Also, an additive pipe 118 is supported by a bracket 120 generally in tangential relation to the upper portion of the perforate drum 52 for discharging chemical additives or the like to the riced potatoes which are disposed interiorly of the drum for thoroughly intermingling the chemical additive with the riced potatoes in the drum.

In FIGURE 7, the enlarged detail section of the perforate drum is illustrated in which each of the apertures or perforations 54 is provided with a rounded or radiused upper edge 122 and lower edge 124, which provides a smooth and rounded edge rather than a sharp edge on the perforations whereby the cellular structure of the potatoes will not be damaged when they are forced through the apertures to the extent they would be damaged by forcing the potatoes through a sharp cornered aperture or perforation.

An important advantage from using the combination of a solid drum and a perforated drum is that in actual practice, the solid drum picks up considerable foreign objects such as eyes and pieces of potato skins quite often overlooked by the sorters and the cleaning knife, which may be pivoted inwardly by the handle 116, will easily remove the foreign material from the solid drum.

A very important feature in the production quality of the flaked potatoes produced by the machine is the rounding or smoothing of the radius on each of the individual holes of the perforated metal of the perforated drum. It is particularly important to prevent cellular breakdown of the potato when they are dehydrated and later reconstituted to mashed potatoes. In order to accomplish this, a minimum of handling and working of the potato is necessary. Gentle squeezing of the cooked potato through the smooth holes rather than a sharp edge will accomplish this with much less cellular breakdown than a squared edged hole.

In operation, the drums are closely spaced and no material continues on through the gap in that all material goes into the perforated drum and out the end except for some possible foreign material that adheres to the solid drum. On this machine, the entire ricing operation is done completely with only one perforated drum, and of course, the ricing is accomplished by employing potatoes which have been previously cut to the thickness not exceeding three-quarters of an inch and has been steam cooked to a desired degree. Further, the ricer has decided advantages in simplicity and low initial cost of manufacture. This machine is sufficiently small to be placed directly over the drum dryer which allows the riced mash to drop directly on the drum by gravity where it is dried to a flake form thereby eliminating the necessity of any handling or conveying of the riced mash between these two processes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A potato ricing device comprising a pair of rigid cylindrical drums arranged in side by side relation and supported for rotation about parallel inclined axes, one of said drums being perforate throughout the peripheral surface thereof and the other of said drums being imperforate, the lower end of said perforate drum being open and forming a discharge for riced potatoes, means drivingly connected to said drums for rotating the drums in opposite directions, supply means disposed above the drums for discharging cooked potatoes between the drums, said drums being disposed in close relationship whereby potatoes passing between the drums will be forced through the perforations in the perforated drum thereby being riced and discharged from the lower end thereof, the space between the drums being completely free of obstructions whereby the drums form the sole means for forcing the potatoes through the perforations in the perforated drum, said perforated drum including a laterally projecting peripheral flange on each end thereof extending in closely adjacent relationship to and inwardly beyond the ends of the imperforate drum at the point of adjacency between the drums thereby retaining the potatoes from moving longitudinally of the drums, the external surface of the imperforate drum being smooth whereby foreign material such as potato eyes, fragments of skin and the like will be picked up by the imperforate drum, and a movable scraper blade disposed closely adjacent the peripheral surface of the imperforate drum only for removing the foreign material therefrom, the perforations in the perforated drum each having a rounded inner and outer edge for reducing breakdown of the cellular structure of the potatoes as they are forced therethrough, support means for said drums including an inclined supporting frame, said drums being mounted on said frame, a stand for said frame, said frame being pivotally mounted on the stand for swinging movement thereof generally in a horizontal plane for enabling the frame and the drums thereon to move from a position in overlying relation to a drum drier to a position spaced away from the drum drier for ease of cleaning of the drums, and means mounting at least one of the drums on the frame for lateral adjustment for enabling adjustment of the spatial relation between the drums.

References Cited in the file of this patent

UNITED STATES PATENTS

| | | |
|---|---|---|
| 366,459 | Clauss | July 12, 1887 |
| 1,244,774 | Pointe | Oct. 30, 1917 |
| 1,296,112 | Peiler | Mar. 4, 1919 |
| 1,766,325 | Boze | June 24, 1930 |
| 2,059,486 | Payne et al. | Nov. 3, 1936 |
| 2,125,993 | Dellinger | Aug. 9, 1938 |
| 2,163,878 | Horning | June 27, 1939 |
| 2,306,655 | Truax | Dec. 29, 1942 |
| 2,308,031 | Schmitz | Jan. 12, 1943 |
| 2,572,506 | Mongelli et al. | Oct. 23, 1951 |
| 2,712,439 | Lamb | July 5, 1955 |
| 2,786,504 | Samler | Mar. 26, 1957 |
| 2,788,732 | Templeton | Apr. 16, 1957 |
| 2,959,487 | Notter et al. | Nov. 8, 1960 |
| 2,972,378 | Nuyens | Feb. 21, 1961 |

FOREIGN PATENTS

| | | |
|---|---|---|
| 340,955 | France | May 27, 1904 |